June 3, 1930.  H. P. BALL  1,761,862
MUSIC ROLL
Original Filed Feb. 5, 1924
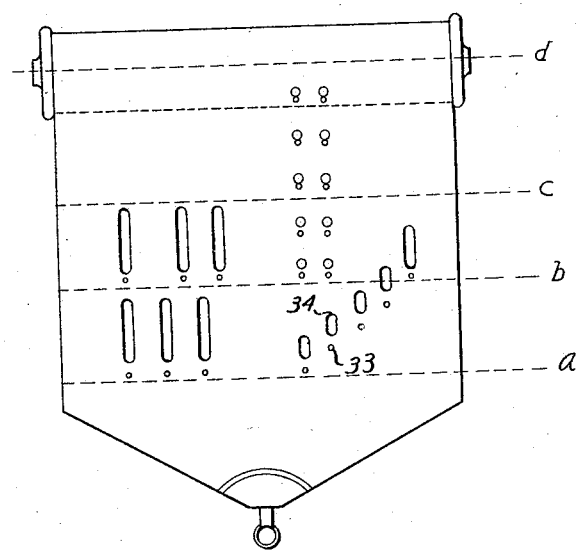
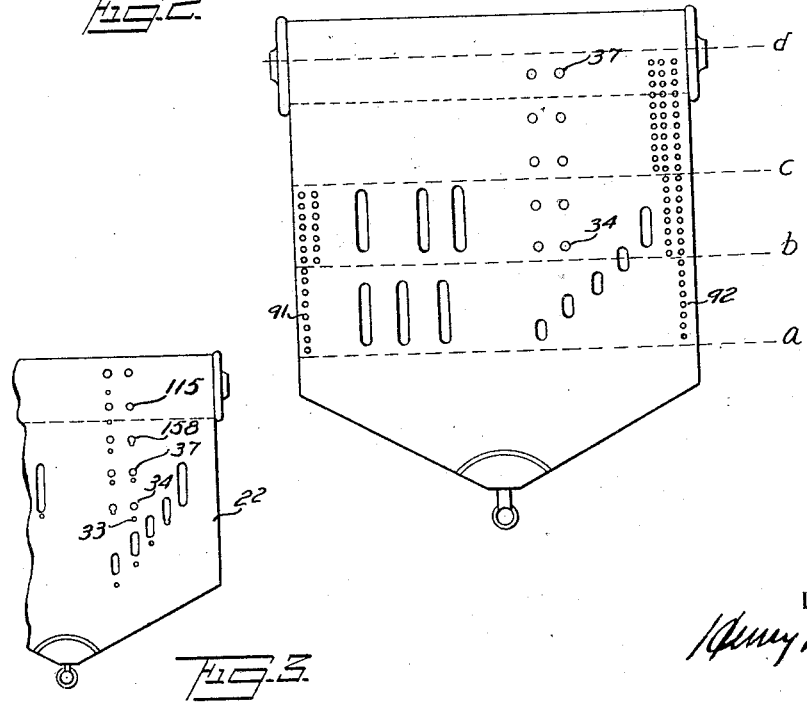
INVENTOR
Henry Price Ball Patented June 3, 1930

1,761,862

UNITED STATES PATENT OFFICE

HENRY PRICE BALL, OF BROOKLYN, NEW YORK

MUSIC ROLL

Original application filed February 5, 1924, Serial No. 690,756, now Patent No. 1,716,811, dated June 11, 1929. Divided and this application filed October 9, 1926. Serial No. 140,620.

This invention is in the art of recording and reproducing music, especially that produced by the piano, and relates specifically to the music sheet record which in the form shown consists of a perforated strip of paper, certain of the perforations representing the notes played while others represent the expression with which the notes were played with special reference to their dynamic value. This record is usually employed to control the reproduction of the music upon my special player piano adapted to coact therewith and which is described in my co-pending United States patent application Serial No. 140,619 filed Oct. 9, 1926. This record can also be read by anyone skilled in this art the same as a printed sheet of music. The invention, therefore, broadly speaking, comprises a record of a musical performance.

This application is a division based on my original United States patent application No. 690,756 filed February 5, 1924, now Patent No. 1,716,811, June 11, 1929.

The objects of my invention are as follows:

(1) To provide a record of a performance on a piano, which record can be used directly to control a reproducing piano to reproduce the performance of an artist in every detail, as to phrasing, pedaling, tempo and quality or timbre of tone as well as the dynamic value of each note played.

(2) To provide a musical record giving the individual dynamic value of each note played on the piano; in other words, to record each note played in such a way that it can be reproduced upon a reproducing piano exactly as the artist played it as regards its intensity.

(3) To provide a music record without a great number of marginal holes as at present, and which are located at great expense and which are not a part of the orginal record; and other objects as will be developed hereinafter.

Referring to the drawings, Fig. 1 is a view of a music sheet showing a musical record within my invention; Fig. 2 is a view of a commercial music sheet on the market at the present time; Fig. 3 is a view of my improved music sheet record.

Referring to the drawings, I have shown in Figs. 1 and 3 a music sheet having the same method of indicating the dynamic intensity of the notes and which constitutes the subject matter of this invention, whereas in Fig. 2 I have shown a well known type of music sheet in the prior art, having note holes and marginal holes for expression. My music sheet, which in its preferred form is shown in Fig. 3, consists of a long strip of paper 22 which has been marked or perforated as shown. I prefer to perforate the sheet instead of marking it so that it can be used to control a player piano. The perforations used to represent the notes played are round for staccato notes such as 33 and 115 (Fig. 3), or elongated for sustained notes as 34 (Fig. 1), but in any case these note perforations are of the same width across the sheet 22. These note perforations are located in the sheet to represent the tempo and phrasing of the music by their relative position to imaginary lateral lines representing the beats of the musical measures. Immediately in advance of the note perforations I locate round expression holes 33 (preferably of smaller size than the staccato not perforations 115) at various distances from the note perforations depending upon the degree of intensity with which the notes are struck or are to be played. A very soft note would be indicated by a comparatively long distance between the expression hole and the beginning of the note hole, such as holes 33 and 34 (Fig. 3); and as the notes are to indicate louder playing, this distance becomes less as shown in the diagonally disposed holes in the sheet until the expression hole 33 merges into the note hole 34, at which time the note is indicated to be the loudest. Attention is called to perforation 158 (Fig. 3) to illustrate this merging of the perforations wherein the expression hole is still discernible, while in perforation 115, one of the loudest notes of the series shown in this longitudinal line, the expression hole has lost its identity, so to speak, in the note hole. It is easily seen that by this invention I can indicate notes having an infinite variety of dynamic values and each note is independent of the other.

In Fig. 2 I have shown the same music roll as that shown by Fig. 3 but without the small holes 33. This figure is intended to represent one form of reproducing roll now on the market and my purpose in showing this is to call attention to the fact that after I make a record of a performance as in Fig. 3, I may use it as a guide in laying out or editing the marginal perforations 91—92 (Fig. 2). These marginal perforations 91—92 are employed in reproducing pianos now on the market to control the intensity of the notes which come within certain zones $a$, $b$, $c$, $d$, on the music sheet. They, therefore, control the intensities of groups of notes in a zone as distinguished from my method of controlling the intensity of each individual note. The marginal holes 91—92 indicate the intensity of the notes in each zone as follows: One row of marginal holes indicates soft playing intensity, two rows medium, and three rows loud. By using my record shown in Fig. 3 as a guide, I save considerable labor and expense in so having the marginal holes determined, as otherwise they would have to be laid out by a highly skilled musician without anything to guide him. If the record as in Fig. 3 is to be used for this purpose solely (simply as a guide), then it is not necessary to perforate the small holes 33 in the music sheet, but these can be marked by a pencil, pen or prick punch, or any other way so long as they indicate the intensity of the tone by the distance of such marks from the note perforations.

It is, of course, understood that using my record as shown in Fig. 3, to produce a music roll as shown in Fig. 2, would not enable such a music roll to be used in known player pianos to produce the same effect as my record as shown in Fig. 3 would produce when used in my reproducing action described in my aforesaid co-pending case, and in order to more clearly bring out this point, reference is made to Fig. 1 which shows a hypothetical record of a performance which would correspond to the effects produced by the music roll shown in Fig. 2. In other words, the music roll shown in Fig. 1 when used in my reproducing piano forming the subject matter of my divisional application, would produce similar effects as the music roll shown in Fig. 2 would produce in known instruments. By comparing the effects that would be produced in Fig. 1 as indicated by the small perforations 33 in their relation to the note perforation 34, with the effects produced by the arrangement of the note perforations in Fig. 3, it will be seen that the effects produced by the music roll shown in Fig. 1 would be more mechanical and inartistic and in no sense would represent the performance of an artist. This is for the reason that all notes coming in the zones between the lines $a$ and $b$ or between the lines $b$ and $c$, or $c$ and $d$, would have the same intensities as indicated by the respective marginal holes 91—92 in these zones. Compare with Fig. 3 wherein an unlimited variety of expression is possible.

There are many modifications of the above disclosures that can be made by one skilled in the art to which this invention pertains, all of which modifications would, however, come within the scope of this invention.

What I claim as my invention and desire to cover by Letters Patent is:

1. A music-sheet having a perforation representing a tone, and a second round perforation, longitudinally in line therewith, indicating by its distance of separation therefrom the intensity of the tone.

2. A music sheet having a perforation representing a note to be played and a second perforation of smaller size located specific distances from the first named perforation corresponding to the specific amount of intensity of tone desired.

3. A music sheet having perforations grouped in pairs, one pair for each tone, one perforation separated a distance from the other perforation in the pair, an amount indicative of the amount of dynamic value of the tone.

4. A music sheet having perforations grouped in pairs, one pair for each tone, the perforations in each pair being spaced various distances apart according to the various intensities of tone desired.

5. A music sheet having a hole representing a tone and a second hole indicating by its distance therefrom the intensity of tone desired.

6. A music sheet having perforations therein arranged in pairs, one pair for each tone, the perforations in each pair indicating by their amount of separation the amount of intensity of tone desired.

7. A music sheet having a pair of perforations representing a tone, the amount of separation between the perforations showing inversely the amount of the intensity of the tone.

8. In a music sheet a note hole and an adjacent pilot hole separated from the note hole an amount proportional to the amount of intensity of the note.

9. In a music sheet a pair of holes for each note, the distance of separation between the holes corresponding to the graduated intensities of the tone.

10. A music sheet having perforations therein arranged in pairs, one pair for each tone, the perforations in each pair indicating by the amount of separation of the front ends of said perforations the amount of tone intensity.

11. A music sheet having a note hole and a pilot hole in advance thereof, the front ends of both holes separated an amount indicative by the degree of separation the degree of intensity of said note.

Signed at New York in the county of New York and State of New York, this 8th day of October, A. D. 1926.

HENRY PRICE BALL.